United States Patent [19]

Sauter

[11] Patent Number: 5,189,754
[45] Date of Patent: Mar. 2, 1993

[54] CAR WASH AIR BLOWER SYSTEM

[76] Inventor: Jerry R. Sauter, 1905 Birdseye Creek Road, Gold Hill, Oreg. 97525

[21] Appl. No.: 621,993

[22] Filed: Dec. 4, 1990

[51] Int. Cl.[5] .............................................. B60S 3/04
[52] U.S. Cl. .................................... 15/316.1; 15/405; 34/243 C; 417/312
[58] Field of Search .................... 15/316.1, 405, 312.1; 34/243 C, 229; 415/182.1; 417/312, 423.14

[56] References Cited

U.S. PATENT DOCUMENTS

| | | | |
|---|---|---|---|
| 2,758,392 | 8/1956 | Vani et al. | 34/243 C X |
| 3,409,995 | 11/1968 | Greenwoat et al. | 34/243 C X |
| 3,808,703 | 5/1974 | Kamiya | 15/316.1 X |
| 3,877,107 | 4/1975 | Cirino | 15/316.1 X |
| 3,903,562 | 9/1975 | Miles | 15/316.1 X |
| 3,994,041 | 11/1976 | Barber | 15/312.1 X |
| 4,409,035 | 10/1983 | McElroy et al. | 134/6 |
| 4,446,592 | 5/1984 | McElroy | 15/316.1 |
| 4,589,160 | 5/1986 | Day et al. | 15/316.1 |
| 4,978,281 | 12/1990 | Conger | 417/423.14 X |

Primary Examiner—Chris K. Moore
Attorney, Agent, or Firm—Edward B. Anderson

[57] ABSTRACT

An air distribution system of a car wash air blower system is provided for directing air to a vehicle travelling along a predefined path using an air producer mounted on each side of the path for producing flowing air. An air distribution system associated with each air producer directs air along a plurality of predefined routes from the air producer to a plurality of locations along the path. The predefined routes are substantially symmetrical about a vertical plane containing the vehicle path. Nozzle assemblies are attached to the distribution system at the ends of the predefined routes for directing air toward a vehicle travelling along the vehicle path. The air producer completely encloses a fan and drive motor. A pivoting hinge hinges a first section of a duct relative to a second section of a duct. The first hinge section is pivotally secured to the second hinge section in a manner allowing rotation of the second hinge section about a defined axis of air travel. The two hinge sections are secured by a frame mounted in the air flow path to the hinge sections. A nozzle directs a stream of air toward the surface of a vehicle positioned adjacent to the nozzle. The nozzle includes a curved plenum portion formed of a flexible webbing and having a generally triangular shape. Nozzle openings are formed of two offset rows protected by ridges formed in a rub pad extending along the rows of openings.

3 Claims, 5 Drawing Sheets

CAR WASH AIR BLOWER SYSTEM

FIELD OF THE INVENTION

This invention relates to air blower systems for vehicles, such as in a car wash, and particularly to such systems having enclosed air pumps and hinged nozzle assemblies.

BACKGROUND OF THE INVENTION

Historically, automatic car washes have included an air blower system for blowing water off of vehicles after being washed, in order to avoid leaving water marks on the vehicle surface. The original air blowers were positioned away from the travel path of a car moving through a car wash, so that there would be no contact between the air blower nozzles and the vehicle. This required using very large (such as 100 to 150 HP) and extremely noisy blower motors.

In order to reduce the size of the blower motors, air distribution systems were developed that included nozzles positioned close to, and sometimes in contact with the vehicle surface. An example of such as system is the model having the proprietary name of "The Stripper" manufactured by Proto-Vest, Inc. of Oxford, Mich. This blower system is also covered by various U.S. patents, including U.S. Pat. Nos. 4,409,035 for a "Clamp for Varying the Hinging Action of a Fluid Stripping Bag", 4,446,592 for a "Nozzle Assembly", and 4,589,160 for "Apparatus for Stripping Fluids Including Dimensionally Stable and Substantially Rigid Bag".

This proprietary blower system uses a smaller blower motor since it uses fibrous bags that are substantially rigid when inflated. The commercial version of the bag does not hinge to accommodate differences in vehicle surfaces. Further, the blower motor is bulky and generates a substantial amount of noise, since it is typically mounted close to the vehicle path to minimize the amount of ducting required to distribute the compressed air to the nozzles. Also, the varying lengths of ducts, from short ones near the motor, to long ones located on the opposite side of the car track, result in some inequality of air pressure applied to each of the nozzles. This results in some inconsistency in the effectiveness of the various nozzles in removing water.

Since the nozzles are made of a rigid plastic, a row of rollers are used that extend along a lip of the nozzle for contacting the vehicle surface, and therefore reduce the amount of scraping of the surface. Such nozzles, however, tend to be relatively heavy and expensive to manufacture.

There thus remains a need for an air blower system that is compact and operates relatively quietly, has generally uniform air flow through the various nozzles, and has a nozzle assembly that locates the nozzles close to a vehicle surface without marring the surface and moves readily to conform to the vehicle surface as the vehicle moves past the nozzles.

SUMMARY OF THE INVENTION

These features are provided in the present invention by an air blower system having distributed encased blowers with freely hinged nozzle assemblies.

In one aspect of the invention, an air distribution system is provided for directing air to a vehicle travelling along a predefined path center using an air producer mounted on each side of the path for producing flowing air. An air distribution system associated with each air producer directs air along predefined routes from the air producer to a plurality of locations along the path. The routes are substantially symmetrical about a vertical plane containing the vehicle path center. Nozzle assemblies are attached to the distribution system at the ends of the routes for directing air toward a vehicle travelling along the vehicle path.

In another aspect of the invention, an air producer is provided that has an inlet and an outlet spaced from the inlet, with an air travel path between the inlet and the outlet. A fan is mounted in the air travel path between the inlet and the outlet so that substantially all of the air flowing through the air travel path also flows through the fan.

In yet another aspect of the invention, a pivoting hinge usable for hinging a first section of a duct relative to a second section of a duct is provided. A first hinge section is attachable to the first section of the duct for transmitting air flowing between the first and second sections of the duct along a defined axis of air travel. A second hinge section is attachable to the second section of the duct for further transmitting air flowing between the first and second sections of the duct. The first hinge section is pivotally secured to the second hinge section in a manner allowing rotation of the second hinge section about the defined axis of air travel. The two hinge sections are preferably secured by a frame mounted in the air flow path to the hinge sections. The mounting to at least one of the hinge sections provides pivoting between the hinge section and the frame.

In a further aspect of the invention, a nozzle is connectable to a pressurized air source for directing a stream of air toward the surface of a vehicle positioned adjacent to the nozzle. The nozzle has an air inlet portion connectable to the pressurized air source for transmitting air from the air source into the nozzle. An outlet portion has a plurality of openings distributed linearly. There are preferably two rows of alternating openings to produce a generally uniform air stream. A plenum portion couples the inlet portion to the outlet portion for transmitting air along a travel path between the inlet portion and outlet portion. The plenum portion is formed of a preferably waterproof, rigid webbing and extends in an arc between the inlet and outlet portions.

It will be seen that an air blower system having the features of the present invention will provide flowing air to the surface of a vehicle that uses relatively small motors, is compact and quiet during operation, provides generally uniform air flow to the various nozzles, allows free hinging of the nozzles, thereby permitting contact between the nozzle and vehicle surface with minimal marring, and uses a curved nozzle formed of resilient material to reduce abrasion while providing contact with the vehicle surface.

These and other features and advantages of the present invention will be apparent from the following detailed description of the preferred embodiment and associated drawings.

BRIEF DESCRIPTION OF THE DRAWINGS

FIG. 6 is a side view of a nozzle used in the system of FIG. 1 showing the configuration of outlet openings.

DETAILED DESCRIPTION OF THE PREFERRED EMBODIMENT

Figure 1:
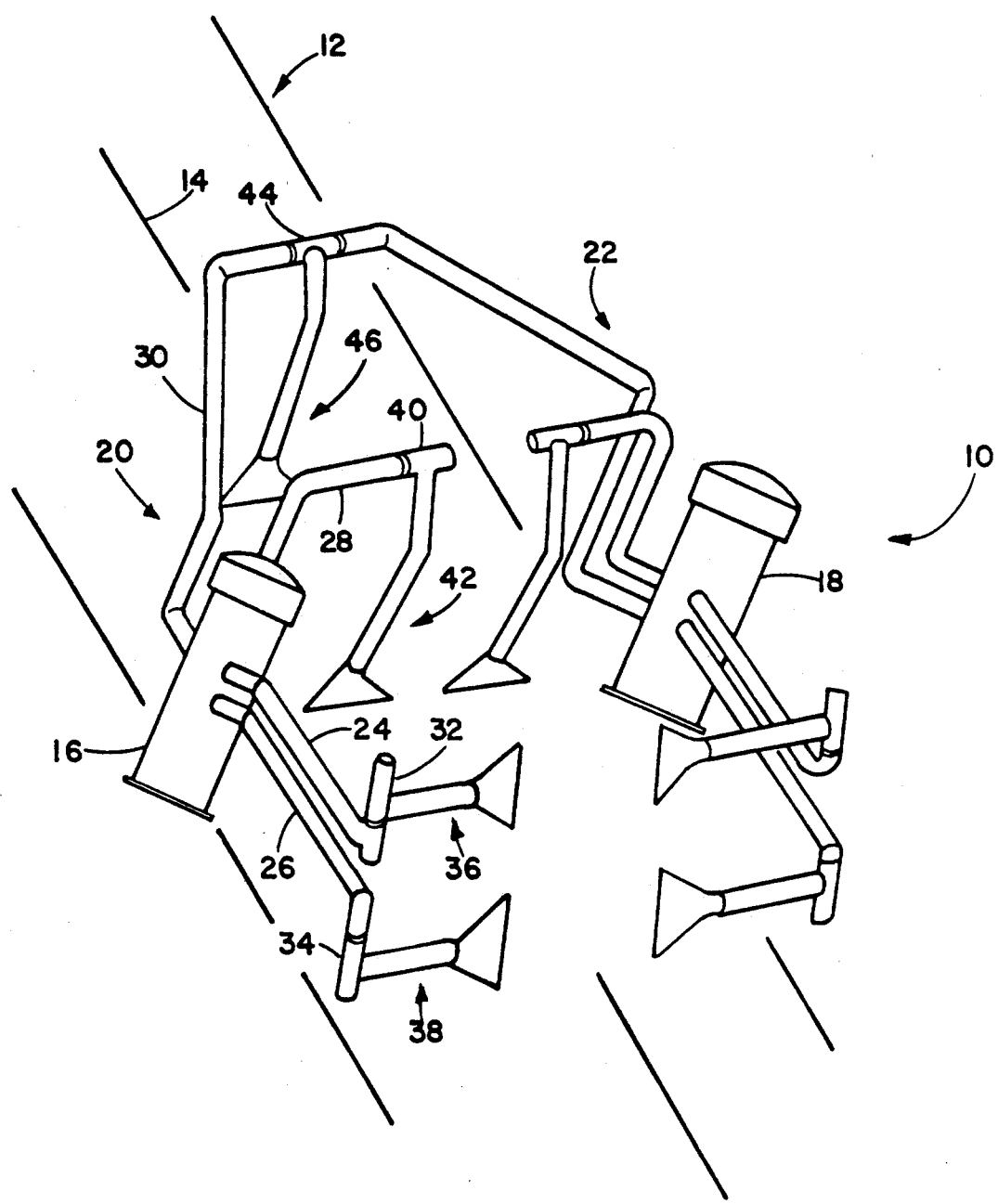
FIG. 1 is a perspective sketch, not to scale, of an air blower system made according to the invention.

Referring initially to FIG. 1, an air blower system 10 embodying the invention is shown in relationship to a vehicle track, shown generally at 12 and having a path center 14, of a vehicle washing system, not otherwise shown.

System 10 includes air producers or blowers 16 and 18, one being positioned on each side of the vehicle track. The structure of these producers are described with reference to FIG. 2. Each air producer generates a volume of air that is distributed through a right distribution system 20 and a left distribution system 22. The designation of right and left as used herein is from the perspective of an individual travelling in a vehicle along track 12 from the upper left of the figure to the lower right.

Distribution systems 20 and 22 are symmetrical about a plane passing vertically through path center 14. Only distribution system 20 will be described. The description is equally applicable to system 22.

Figure 2:
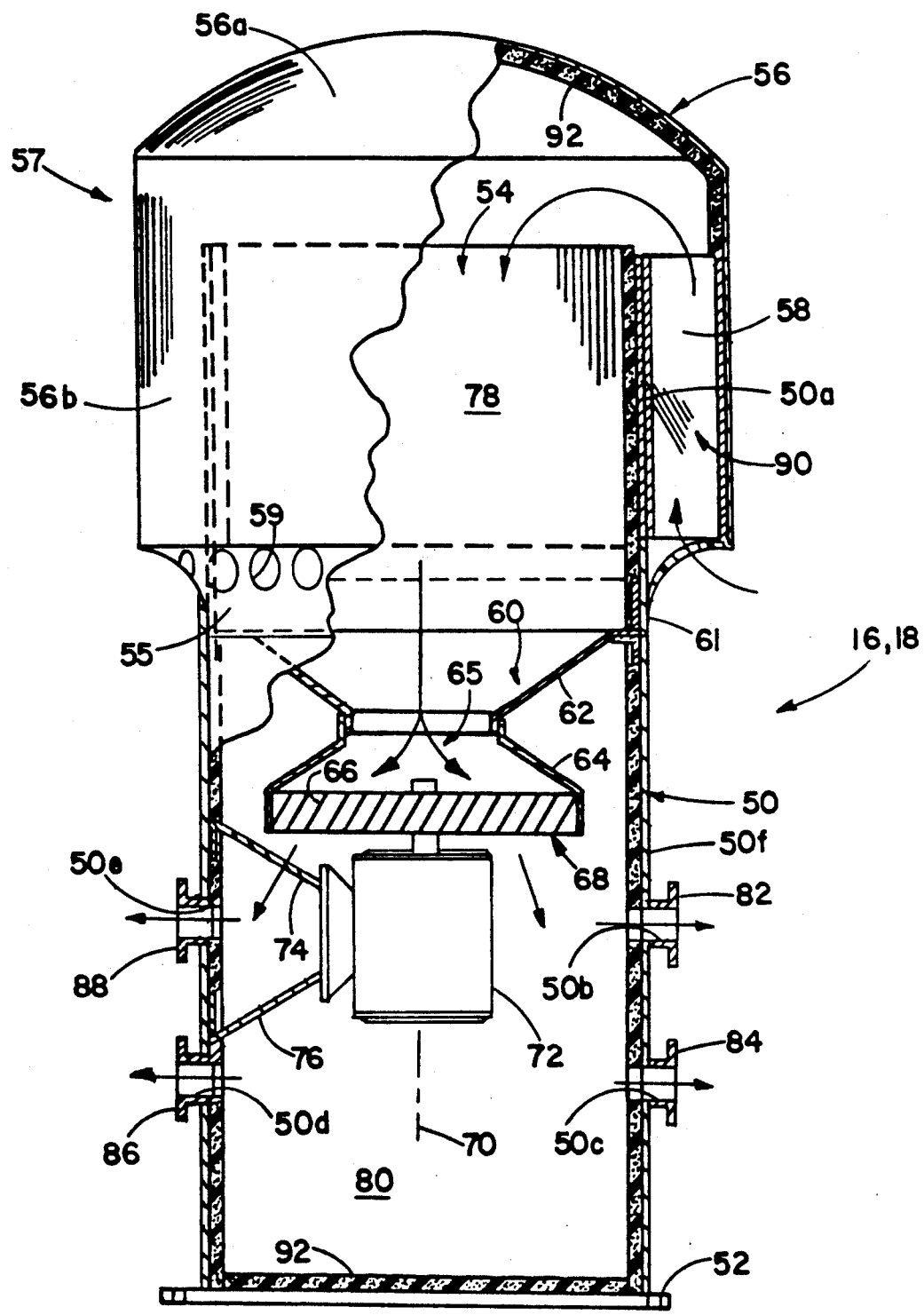
FIG. 2 is a partial cross section of an air producer used in the system of FIG. 1.

Distribution 20 includes four duct lines 24, 26, 28 and 30, and are connected to air producer 16. The location of the connections are shown in FIG. 2. The support structure and actual dimensions and shape of the duct lines are not shown, as these are readily apparent to one skilled in the relevant art.

Lines 24 and 26 extend forward of the air producer and are spaced vertically, as illustrated, for blowing water from the side surfaces of a vehicle passing through system 10. The duct lines terminate at duct hinges 32 and 34, for supporting nozzle assemblies 36 and 38, respectively. As will be discussed in further detail with reference to FIGS. 3–5, the hinges allow the nozzle assemblies to rotate freely about an axis passing through each hinge. They are preferably held in position by a small pressurized oil-filled cylinder (not shown) attached across the hinges, as is conventionally known in the industry. As a vehicle passes through and contacts these nozzles, the vehicle pushes them forward and they pivot away from the path center, following the side of the vehicle as it passes.

As shown, intermediate distribution line 28 is supported above the vehicle, with a duct hinge 40 having a generally horizontal pivot axis. A nozzle assembly 42 is suspended from hinge 40 and spaced to the side of a vertical plane passing through path center 14. These intermediate nozzles blow fluid from the outer edges of the top or upward-facing surfaces of a vehicle.

The three distribution lines 24,26 and 28 have lengths that are about the same. Rear distribution line 30 extends behind the intermediate line for initially contacting an upward-facing vehicle surface. This line is significantly longer than the other distribution lines, and is therefore coupled to the rear distribution line associated with left distribution system 22. These combined distribution lines are coupled to a single rear duct hinge 44 having a horizontal pivot axis. A nozzle assembly 46 is suspended downwardly for swinging in the vertical plane containing path center 14.

These downward hinging nozzle assemblies are also preferably controllably lifted by small lightweight air cylinders (not shown) and are lowered in a regulated fashion by an air spring or other suitable device (also not shown). These allow the nozzle assemblies to be lifted out of the way when desired, such as when a vehicle has a luggage rack that could damage a nozzle, or when it is desired to keep the nozzles out of a dirty pick-up bed.

The air producers illustrated in FIG. 2 generate an air outlet plenum that is in communication with each of the four distribution lines. Thus each line is fed air at substantially equal pressure. When the air resistance in each line is equal, each line receives the same volume of air flow. This is approximately the situation with distribution lines 24, 26 and 28. When line 30 is about twice as long as the other lines, and is fed from both air producers, as shown, nozzle assembly 46 receives about the same air flow as the other nozzle assemblies. Thus, the nozzle assemblies output about the same volume of air and are therefore, when using identical nozzle assemblies, about equal in effectiveness in removing water from a vehicle surface.

Referring now to FIG. 2, an air producer 16, the same as air producer 18, is shown in partial vertical cross section. Producer 16 includes a cylindrical housing 50 closed at the bottom by a mounting plate 52 that is used to fasten the air producer to the floor or other structure of the car wash facility. The upper end is open, forming an air inlet 54. The upper end is covered by a shroud or downward-opening cap 56 that is spaced from the inlet. Cap 56 includes an upper curved portion 56a and a skirt portion 56b that extends around the upper walls 50a of the housing. Cap 56 is supported on housing 50 by wings 58 that extend between housing walls 50a and skirt portion 56b, or other suitable means. A cover 55 having a plurality of openings 59 extends between the lower skirt edge and housing 50. Ambient air enters the air producer through openings 59. Cap 56, walls 50a, cover 57, and support wings 58 preferably form an integral unit 57 made of a light material, such as aluminum or fiberglass. Walls 50a are supported on the top edge of lower walls 50f and receive a sleeve 61 mounted to and extending up from the lower walls, as shown.

On the inside of housing 50 intermediate the ends, a funnel 60 is mounted. Funnel 60 includes a restricting portion 62 and an expanding portion 64. The restricting portion narrows to a passageway 65 that is smaller than the diameter of the housing. The expanding portion opens to a diameter corresponding to the outer diameter of blades 66 of a fan 68, which diameter is greater than the diameter of passageway 65. The fan rotates about an axis 70 corresponding to the longitudinal axis of the housing. The fan is supported and driven by a motor 72 that is suitably mounted to the housing, such as by mounting brackets 74 and 76.

Funnel 60 divides the housing into an inlet chamber 78 at its upper end in unit 57, and an outlet plenum 80 at its lower end. Disposed in the housing walls in the outlet plenum are four apertures 50b, 50c, 50d and 50e. These apertures are the outlets of the air producer. Mounted on the outside walls of the housing are duct flange members 82, 84, 86 and 88, associated with apertures 50b, 50c, 50d and 50e, respectively. The flange members attach to the inlet ends of the distribution lines.

The cap, funnel and housing thus define an air travel path 90, with the air entering upwardly through the opening 59, curving 180° in the cap and passing downwardly through the inlet plenum, through the restricting funnel, and through the fan blades into the outlet plenum. By enclosing the fan and motor within the housing, the noise of operation is substantially reduced. Further, by providing the direction-reversing bend in the extended air travel path defined by cap 56 and walls 50a, the sound of the motor is substantially contained within the housing. The use of the restricting funnel also encloses the motor further in the outlet plenum, limiting noise travel in the air to the restricted passageway. Additional noise reduction is provided by installing a sound-absorbing material to the inside surfaces of the housing and cap, such as a closed-cell foam 92 that is commercially available for that purpose.

The noise created by the fan and motor are thus substantially reduced in comparison to an exteriorly mounted motor as provided by conventional designs. By dividing the air distribution system into two symmetrical halves, and using an air producer on each side of the system, even smaller motors can be used, with yet an additional decrease in the noise level and a more compact system.

Figure 3:
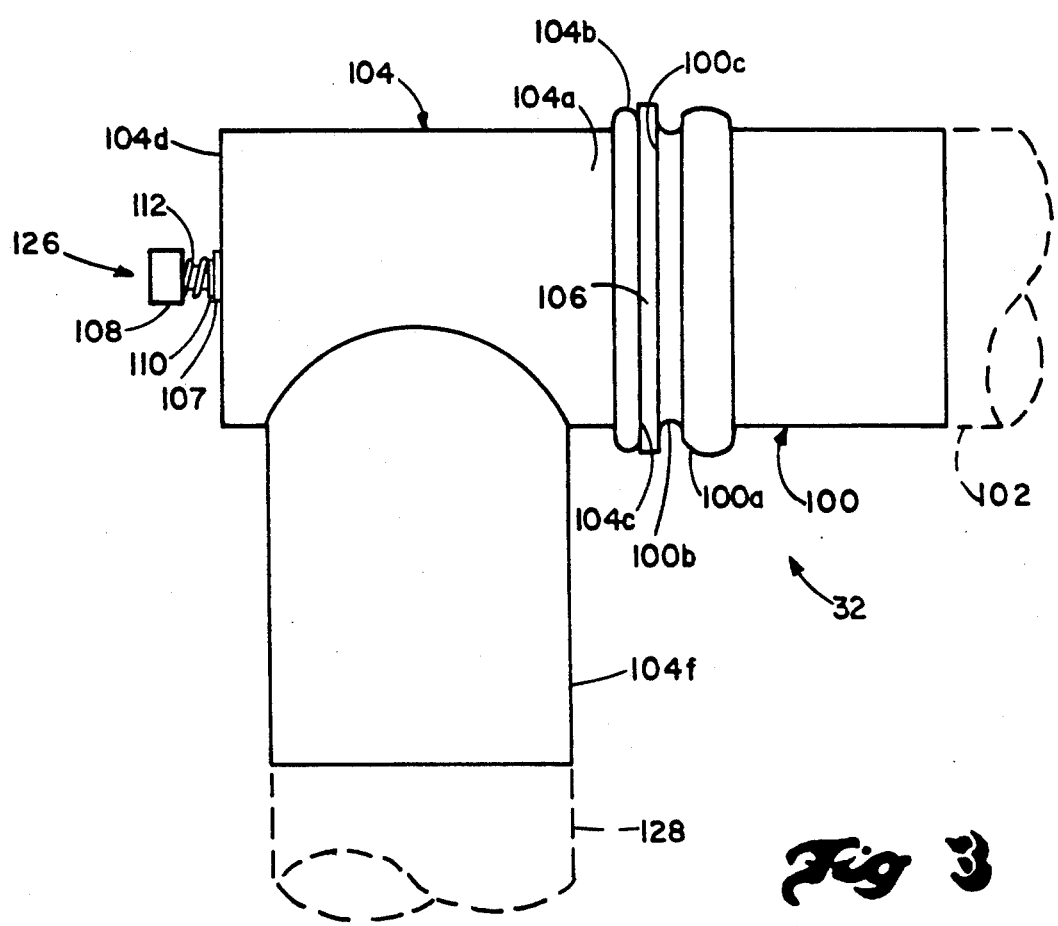
FIG. 3 is a side view of a duct hinge used in the system of FIG. 1.
Figure 4:
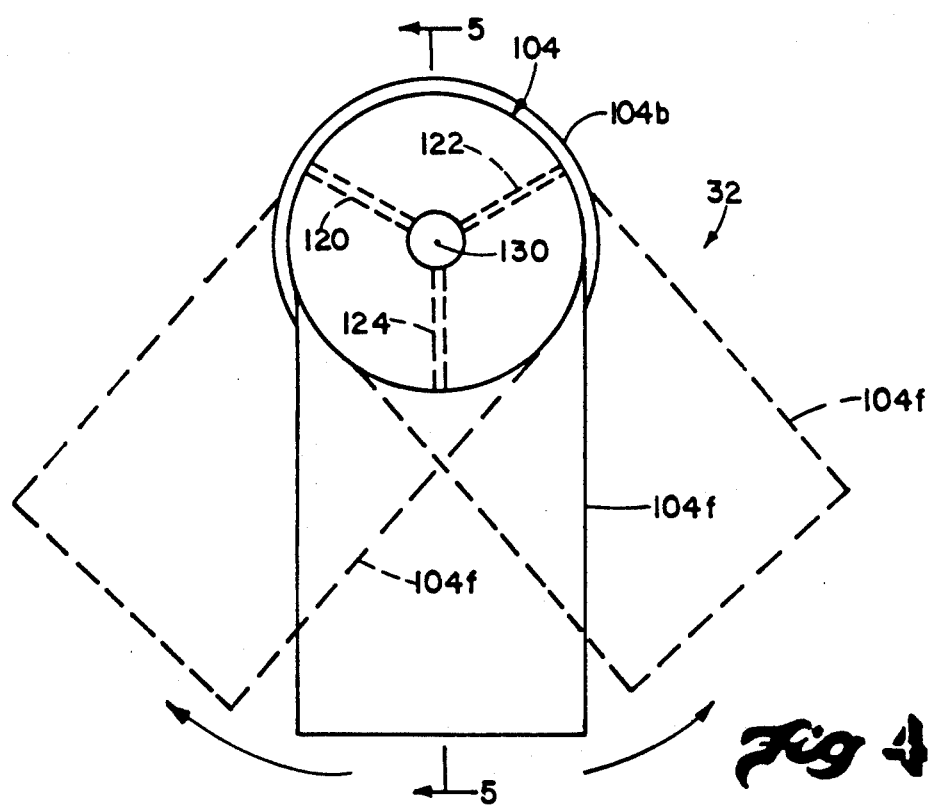
FIG. 4 is an end view of the duct hinge of FIG. 3 as viewed from the left in that figure.
Figure 5:
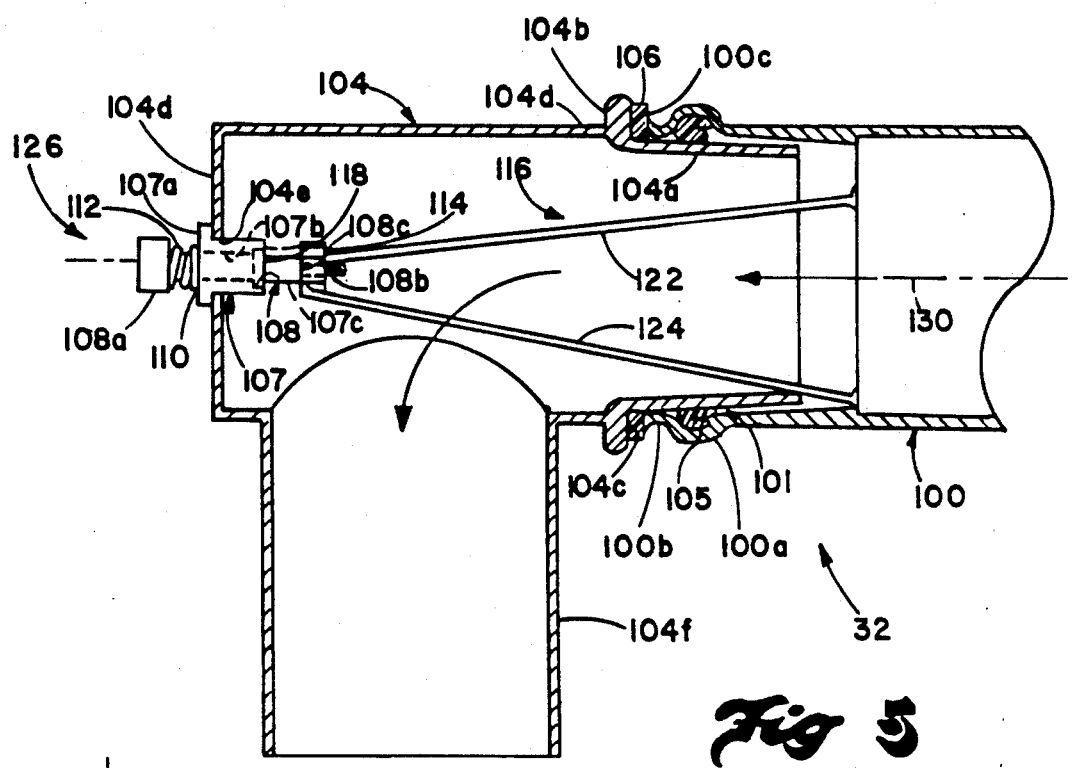
FIG. 5 is a cross-section taken along line 5—5 of FIG. 4.

FIGS. 3-5 illustrate the structure of duct hinges 32, 34 and 40. These hinges have a 90° bend that is used to change the direction of air flow. They could also be built to provide for air flow straight through, or at any transverse angle. Additionally, although they are described for air flow as used in system 10, the air flow could be in either direction, depending on the hinging action desired.

Hinge 32 includes a base collar 100 formed in the end of an inlet duct section 102 of distribution line 24. Collar 100 tapers outwardly away from the attached duct section to a circumferential ridge 100a followed by a circumferential valley or groove 100b, to terminate at a radially extending swivel face 100c. The ridge and valley give the collar strength. Face 100c provides a contact surface allowing pivoting.

A duct pivot member 104 has a swivel end 104a that is received within collar 100 and has a circumferential ridge 104b with a corresponding swivel face 104c facing collar swivel face 100c. Swivel end 104a tapers inwardly into collar 100 from ridge 104b and is slightly spaced from the collar. Positioned between the swivel faces of the collar and pivot member is a resilient, bearing ring 106 extending around the circumference of swivel end 104a.

Positioned within the circumferential cavity 101 formed by ridge 100a and swivel end 104a is an industrial grade expandable rubber gasket 105. This gasket functions as a lateral swivel bearing and prevents air from escaping through the swivel joint.

Opposite from swivel end 104a is a pivot mounting plate 104d that, in this embodiment, forms a closed end to pivot member 104. If the hinge provided straight air flow through it, the plate would have suitable openings. Located centrally in this mounting plate is an aperture 104e sized to receive, by press fit, a plastic or nylon bearing 107. Bearing 107 has an enlarged flange end 107a, a central bore 107b, and an enlarged opening 107c. Bore 107b is sized to slidingly receive a mounting bolt 108. Bolt 108 has an enlarged head 108a. A nylon or teflon flat washer 110 with a corresponding aperture (not shown), that also freely receives bolt 108, is positioned on the outside of bearing end 107a. Head 108a and washer 110 serve as retaining rings for a compression spring 112 that is captured between them on the shaft of bolt 108.

A reduced-diameter threaded end 108b of the shaft of bolt 108 is received in a matingly threaded bore of a nut 114 of a support frame shown generally at 116. The shoulder 108c of bolt 108 formed at the transition to the reduced diameter end 108b seats against nut 114 to lock them in place. An air seal 118 sized to receive bolt 108 and fit within bearing opening 107c, seals the bolt in the bearing to prevent the escape of air.

Nut 114 is supported in duct pivot member 104 by three rigid rods or arms 120, 122 and 124. These arms are fixedly attached to nut 114 and collar 100, such as by welding. The use of arms 120, 122 and 124 allows substantially unrestricted air flow through member 104. Bolt 108 and supporting frame 116 together function as a means or assembly 126 for pivotally securing collar 100 and member 104 together.

The pivot member also includes an outlet section 104f extending at a right angle from the swivel end 104a. The outlet section is connected, in use, to an outlet duct section 128, shown in phantom lines in FIG. 3. The outlet duct section 24 is allowed, by hinge 32, to rotate about an axis of rotation 130 defined by rotation of pivot member 104 relative to collar 100. In the general sense, unless external restrictions are applied to the pivot member, it can rotate completely around collar 100.

FIGS. 6-10 illustrate the structure of a preferred nozzle 132 for use in nozzle assemblies 36, 38, 42 and 46. Nozzle 132 includes an air distributor 134 formed of a lightweight material, and preferably is flexible when not in use. As viewed from the side, as shown in FIG. 6, the air distributor has a generally triangle shape, tapering outwardly from a cylindrical inlet 134a conforming to the shape of a duct tube 136 forming the end of an associated air distribution line shown in FIG. 1. Distributor 134 is held in place on tube 136 by a suitable securing means, such as a clamping band 138.

The air distributor tapers outwardly from the inlet to a linear array 140 of air jets or openings 142 that are about 3/16 inch (0.5 cm) in diameter and extend generally transverse to the incoming direction of air flow. Array 140 includes a first set 144 of openings, and a second set 146 of openings that are offset transverse to the direction of airflow out of the openings. This provides for a uniform line of air moving from the array of openings toward a car surface 148 represented generally by the dashed lines in FIGS. 9 and 10.

In the embodiment of FIGS. 6-10, a plastic guard 150 is mounted on the face of the nozzle with openings 150a conforming to openings 142. Extending generally parallel with array 144 and spaced slightly from it are ridges 152 and 154. These ridges serve two primary purposes. First, they act as contact surfaces for contacting a vehicle, taking the wear against the vehicle surface and protecting openings 142 from being grabbed or engaged by damaging protrusions. This prevents the distributor fabric from being worn or torn at the openings. Second, the ridges form an enclosed region 156 when the first set of openings are close to a vehicle surface. With the air being forced out of the openings, this tends to lift the nozzle away from the vehicle surface, thereby reducing the force of contact of the nozzle on the vehicle.

Figures 9, 10:
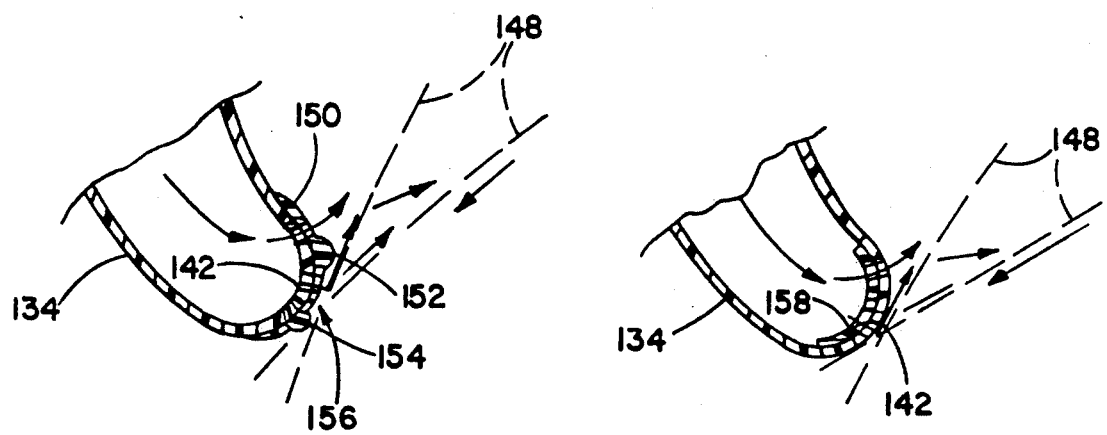
FIGS. 9 and 10 show two embodiments of the outlet structure of the nozzle of FIG. 6.

In the embodiment of FIG. 10, a patch 158 of webbing, preferably made of a material similar to that of the air distributor, is laminated onto the inside surface of the distributor, as shown. Although this embodiment does not have the opening-protecting ridges, it does provide a smooth, uninterrupted and reinforced surface for the vehicle surface to pass along.

Air distributor 134 could be made of a lightweight rigid material, such as a metal. Such materials, however are generally heavier than a fabric, and are more abrasive to a vehicle surface when they come in contact with it. Fabrics have been found to be lightweight until they absorb water, such as from an associated car wash. This increases the pressure of the nozzle on the vehicle surface. In order to properly control the position of opening array 140 relative to a variety of vehicle surfaces, it is important that the air distributor be substantially rigid during use. This is particularly feasible when the nozzle is used with a separate hinging assembly, such as hinges 32, 34, 40 and 44.

Figures 7, 8:
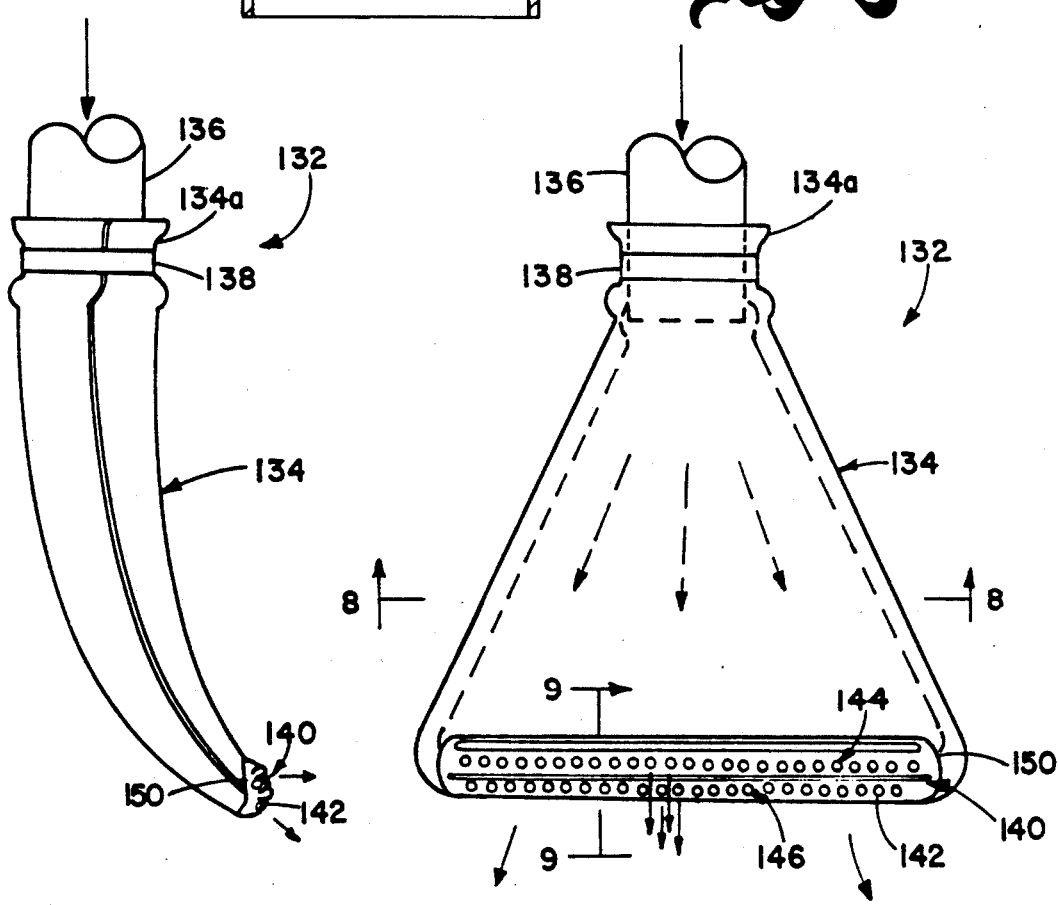
FIG. 7 is a view of the nozzle of FIG. 6 as viewed from the left in that figure.
FIG. 8 is a cross-section taken along line 8—8 in FIG. 6.
Figure 8:
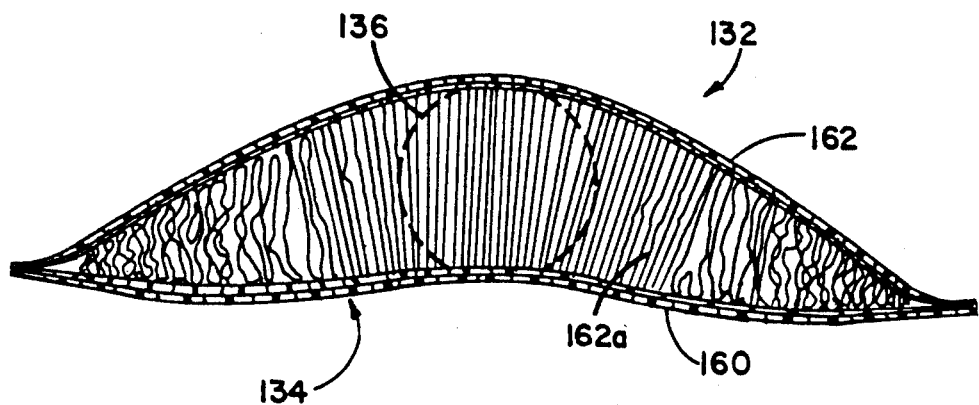

It has been found that the features of lightweightedness, rigidity, and waterproofness are found in a structure particularly shown in FIG. 8 in which an outer layer or skin 160 is made of a waterproof flexible fabric known by the proprietary name Lexatron which is commonly used to construct inflatable objects, such as rafts. In between the skins of fabric is a drop-stitch inflatable fabric 162 made of nylon, such as is provided by U.S. Plush Mills, Inc., of Pawtucket, R.I. The drop-stitch fabric is hot glued to the inside of skins 160 and gathered slightly on the inside of a contour, such as for producing the curve shape shown in FIG. 7. The drop-stitch fabric has threads 162a connecting opposite layers, as shown in FIG. 8, which limit the expansion of the air distributor. A six-inch (15.24 cm) width fabric is preferable for use in nozzle 132. The side edges of the skins are hot glued or vulcanized to form air tight seams. The end face with the openings is a seamless folded portion of the skin.

The curve or arc in the nozzle directed toward the oncoming vehicle surface resists bending of the air distributor backwards when inflated. The inherent rigidity of the air distributor, when inflated during use, also inhibits deformation, thereby transferring any forces from a contacted vehicle to the hinge which is relatively freely rotatable.

The air blower system provided by the invention can thus be seen to provide improved blowing of vehicle surfaces at close range, while protecting the nozzle and vehicle. A freely rotatable hinge minimizes contact force with the vehicle. A generally even-length distribution system applies relatively even air flow to each nozzle. The compact, enclosed air producers are less noisy and obtrusive.

It will be apparent to one skilled in the art that variations in form and detail may be made in the various aspects of the specific design described without varying from the spirit and scope of the invention as defined in the claims. The preferred embodiment is thus provided for purposes of explanation and illustration, but not limitation.

I claim:

1. An air producer usable in a car wash air blower system for producing flowing air comprising:

housing means having walls defining an inlet, an outlet spaced from the inlet, and an air travel path between the inlet and the outlet, the housing means further comprising cap means having walls covering the inlet, having an opening spaced for the inlet, and defining an initial air travel path with a bend greater than ninety degrees between the opening and the inlet; and fan means mounted in the air travel path between the inlet and the outlet, with the housing means and fan means being structured so that substantially all of the air flowing through the inlet and along the air travel path also flows through the fan means.

2. A producer according to claim 1 wherein the walls of the housing means form a generally elongate housing with the inlet being formed in one end of the housing, and the walls of said cap means further form a cover supported away from the inlet having a periphery larger than the inlet, and a skirt extending from the periphery of the cover along the sides of the housing and spaced from the housing, whereby the space between the housing and the skirt defines the opening.

3. An air producer usable in a car wash air blower system for producing flowing air comprising:

an elongate, generally cylindrical housing having walls defining an inlet at one end of the housing and at least one outlet disposed adjacent to the other end, the walls defining an air travel path between the inlet and the outlet;

fan means mounted to the housing walls in the air travel path between the inlet and the outlet, with the fan means defining a cross-sectional area less than the cross-sectional area of the housing and the end of the housing between the fan means and the housing forming a plenum;

funnel means attached to the walls of the housing for reducing the cross-sectional area of the air travel path from the cross-sectional area of the housing substantially to the cross-sectional area of the fan means; and cap means having walls covering the inlet, defining an opening spaced from the inlet, and defining an initial portion of the air travel path with a bend greater than ninety degrees between the opening and the inlet, the walls of the cap means defining a cover supported away from the inlet and having a periphery larger than the inlet and a skirt extending from the periphery of the cover and along the sides of the housing, spaced form the housing, whereby the space between the housing and the skirt defines the opening.

* * * * *